United States Patent
Yoshimaru et al.

(10) Patent No.: US 8,159,727 B2
(45) Date of Patent: Apr. 17, 2012

(54) IMAGE READING APPARATUS AND IMAGE FORMING APPARATUS

(75) Inventors: Akito Yoshimaru, Kanagawa (JP); Nobuyuki Satoh, Kanagawa (JP); Yasuo Sakurai, Kanagawa (JP); Hiroshi Takahashi, Kanagawa (JP); Masato Kobayashi, Kanagawa (JP); Yuichi Sakurada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 577 days.

(21) Appl. No.: 12/318,649

(22) Filed: Jan. 5, 2009

(65) Prior Publication Data

US 2009/0180156 A1    Jul. 16, 2009

(30) Foreign Application Priority Data

Jan. 16, 2008    (JP) .................................. 2008-006446

(51) Int. Cl.
*H04N 1/04*  (2006.01)
*H04N 1/40*  (2006.01)
*H04N 1/387* (2006.01)

(52) U.S. Cl. ........ 358/474; 358/408; 358/450; 358/449; 358/486; 358/488; 358/496; 358/483

(58) Field of Classification Search .................. 358/408, 358/450, 449, 486, 488, 497, 494, 474, 483, 358/482, 505, 514, 461, 475, 509; 382/284, 382/274; 250/234–236, 216, 208.1; 399/380, 399/211, 212
See application file for complete search history.

(56) References Cited

U.S. PATENT DOCUMENTS

| | | | | |
|---|---|---|---|---|
| 4,321,628 A * | 3/1982 | Crean | ........................... | 358/497 |
| 4,449,151 A * | 5/1984 | Yokota et al. | ................. | 358/483 |
| 4,692,812 A * | 9/1987 | Hirahara et al. | ............... | 358/443 |
| 4,774,592 A * | 9/1988 | Suzuki et al. | ................. | 358/451 |
| 5,089,901 A * | 2/1992 | Kaneko | ......................... | 358/474 |
| 5,990,470 A * | 11/1999 | Classens | .................... | 250/208.1 |
| 6,671,421 B1 * | 12/2003 | Ogata et al. | .................. | 382/284 |
| 7,136,204 B2 * | 11/2006 | Chang et al. | .................. | 358/486 |
| 7,298,921 B2 * | 11/2007 | Tinn et al. | ..................... | 382/294 |
| 2007/0206244 A1 | 9/2007 | Kobayashi | | |
| 2009/0027737 A1 * | 1/2009 | Ingendoh | ....................... | 358/474 |
| 2009/0195843 A1 * | 8/2009 | Satoh et al. | .................... | 358/475 |

FOREIGN PATENT DOCUMENTS

| | | |
|---|---|---|
| JP | 56-126373 | 10/1981 |
| JP | 62-101170 | 5/1987 |
| JP | 63-063145 | 3/1988 |
| JP | 10-173872 | 6/1998 |
| JP | 2000-358140 | 12/2000 |

OTHER PUBLICATIONS

Notice of Rejection of Japanese patent application No. 2008-006446 dated Jul. 29, 2011.

* cited by examiner

*Primary Examiner* — Cheukfan Lee
(74) *Attorney, Agent, or Firm* — Harness, Dickey & Pierce, P.L.C.

(57) ABSTRACT

An image reading apparatus is disclosed that includes a contact glass on which a document is placed; an imaging device configured to image a document image based on light reflected from the document through the contact glass; plural line image sensors arranged along a main scanning direction at positions where the document image is imaged and configured so that end portions of the line image sensors adjacent to each other similarly read same image data imaged at an overlapping area; a transmitted light quantity reduction unit disposed in the overlapping area on the contact glass and configured to reduce transmitted light quantity of a light transmitted through the contact glass; and a signal correction device configured to correct the signal intensity of the image data similarly read by the line image sensors adjacent to each other.

20 Claims, 13 Drawing Sheets

IMAGE READING APPARATUS AND IMAGE FORMING APPARATUS

BACKGROUND OF THE INVENTION

1. Field of the Invention

The present invention generally relates to an image reading apparatus and an image forming apparatus. More particularly, the present invention relates to an image reading apparatus including a contact glass on which a document is placed; an imaging device configured to image a document image based on light reflected from the document through the contact glass; plural line image sensors arranged along a main scanning direction at positions where the document image is imaged and configured so that end portions of the line image sensors adjacent to each other similarly read same image data imaged at an overlapping area, and an image data joining device configured to join the image data at the overlapping area similarly read by the end portions of the plural line image sensors to form continuous image data, and an image forming apparatus having such an image reading apparatus.

2. Description of the Related Art

There are some different sizes of sheets to be read by an image reading apparatus, and some image reading apparatuses are capable of reading A0 size documents. The image width of the A0 size is typically about 840 mm. When the whole A0 size document is read by a single CCD line image sensor under 600 dpi resolution, approximately 20,000 pixels image sensors are required to be arranged on the single line image sensor. However, a line sensor having such a large number of pixels is difficult to be manufactured with current technology at reasonable costs, namely the manufacturing cost of such a line sensor becomes high.

Therefore, due to the current limitation of the number of pixels on a single line image sensor, in a document reading apparatus capable of reading an A0 size and/or A1 size document, there has been used a method of reading an image, in which plural CCD line sensors are arranged partially overlapping each other in the main scanning direction (see, for example, Patent Documents 1 and 2).

However, in a case where this method is employed, even when the overlapping portion of the line sensors is strictly adjusted in its manufacturing process, the overlapping portion may become out of alignment due to vibration during transportation, out of alignment of its main body of the system during its mounting, or the like. Once the overlapping portion is out of alignment, the out of alignment of the overlapping portion of the image reading apparatus remains and may not be easily restored. Further, the conjugation length of the image forming optical system of the image reading apparatus typically requires approximately 500 mm to 800 mm, and the reduction ratio of the optical system becomes approximately $1/15$. Therefore, if the CCD line sensor is misaligned by only 10 μm, the image on the surface of a document may be misaligned by as much as 150 μm.

Further, such misalignment in the line image sensors may be generated not only in its manufacturing or mounting process but also by thermal expansion due to the temperature change in the image reading apparatus during operation. Such misalignment (position shift) may be caused in both main scanning direction and sub scanning direction.

To overcome the problem, Patent Document 3 discloses a technique in which a marking is formed at an overlapping reading area read by the CCD line sensors, and the whole image forming optical system is configured to be mechanically shifted in the sub scanning direction to detect the relative position of each optical system, and a sub scanning position is adjusted so that the position shift is minimized.

Patent Document 1: Japanese Patent Application Publication No.: S62-101170

Patent Document 2: Japanese Patent Application Publication No.: S56-126373

Patent Document 3: Japanese Patent Application Publication No.: 2000-358140

However, when a technique such as that proposed in Patent Document 3 is employed, there may arise a problem that the line image sensors are required to be mechanically shifted and guide rods and cams are required to be provided to guide the line image sensors, thereby increasing the cost and impairing the durability of the image reading apparatus. In addition, even when the overlapping portion is well adjusted, the parallelism between the optical systems may be degraded by the position shift of the optical system when, for example, the guide rods become loose. Further, in order to detect the position shift, the line image sensors are required to be moved back and forth to detect the peak position of the line image sensors. Therefore, it takes time to complete the adjustment and a long wait time is required.

In the above configuration, however, a marking for position adjustment may be placed at a position on the contact glass, so that a shifted amount of the marking position detected by each line image sensor is obtained. Based on the obtained shifted amount, data may be shifted to correct the position shift. Unfortunately, this method may not be appropriate because the marking position, i.e., the center portion of the read image, may be shaded and a signal of that portion may not be well obtained. To avoid this problem, a marking may be placed on a member other than the contact glass, and the marking may be configured to be moved outside the image reading area when an image is being read. However, even in this method, there may arise problems; for example, the marking position may be shifted when the movement of the marking is repeated, the marking position may be separated from a document surface level, a surface of document may become dirty, and the cost of the apparatus is increased due to an additional device for moving the marking back and forth.

Further, there may be another method in which a marking is placed onto a document pressing plate or a reference white plate. However, there is a gap generated in the depth direction between the placed marking position and a document surface reading position, therefore, there may arise a problem of causing displacement due to the gap and the like. Further, a sharp line may be used as the marking, however, there may arise a problem; for example, foreign material adhered to the contact glass near the marking position may be mistakenly detected as the marking.

SUMMARY OF THE INVENTION

According to an aspect of the present invention, an image reading apparatus is configured to detect and correct a shift of image data at an overlapping portion of the plural line image sensors to make a continuous image data.

According to an aspect of the present invention, an image reading apparatus includes:

a contact glass on which a document is placed;

an imaging device configured to image a document image based on light reflected from the document through the contact glass;

plural line image sensors arranged along a main scanning direction at positions where the document image is imaged and configured so that end portions of the line image sensors adjacent to each other similarly read same image data imaged at an overlapping area, wherein the image data at the overlapping area similarly read by the end portions of the plural line image sensors are joined to form continuous image data;

a transmitted light quantity reduction unit disposed in the overlapping area on the contact glass and configured to reduce transmitted light quantity of a light transmitted through the contact glass; and a signal correction device configured to correct the signal intensity of the image data similarly read by the line image sensors adjacent to each other.

In an image reading apparatus according to an embodiment of the present invention, a transmitted light quantity reduction unit (i.e., a marking) is formed on the contact glass so that the light quantity of the light transmitting through the contact glass is reduced, the relative positions of the plural line image sensors are detected, and the signal correction device corrects the signal intensity of the image data similarly read by the plural line image sensors. Therefore, it becomes possible to easily join plural image data read by the plural line image sensors to make continuous image data with lower cost without requiring to have a mechanical driving unit.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

In the following, preferred embodiments of the present invention are described with reference to the accompanying drawings.

First Embodiment

Figure 1:
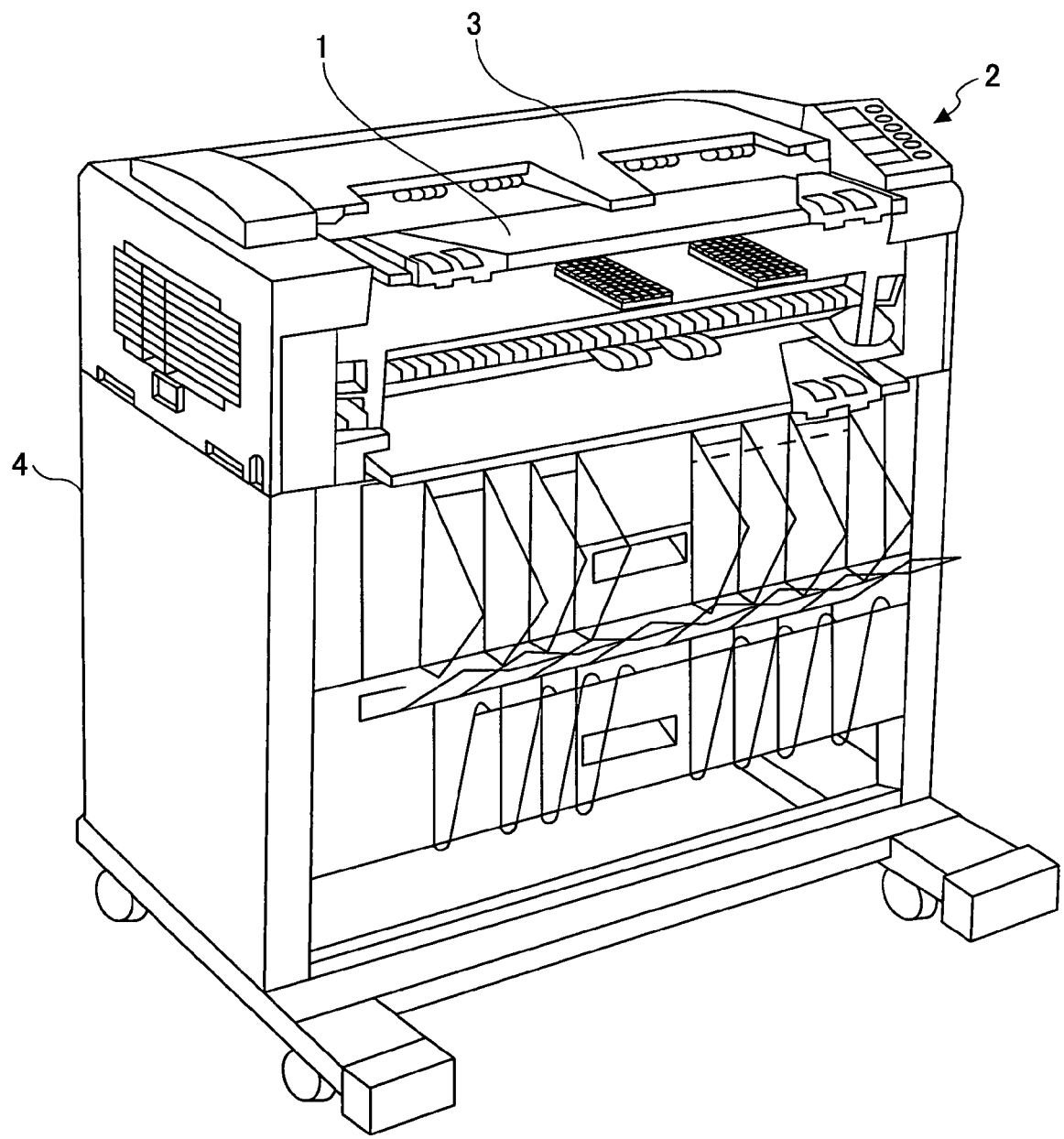
FIG. 1 is a schematic perspective view showing an exterior of a wide-sheet digital copier as an example of an image forming apparatus according to an embodiment of the present invention.

FIG. 1 is a perspective view showing an exterior of a wide-sheet digital copier as an example of an image forming apparatus according to an embodiment of the present invention. As shown in FIG. 1, on the front side of the digital copier, there are provided a document table 1 for inserting a document and an operations panel 2, so that an operator standing in front of the document table 1 can operate necessary key operations of the operations panel 2 and the like while inserting the document into the copier. Such a wide-sheet digital copier generally includes an image reading apparatus for reading an image data of the document, an imaging apparatus, a transferring apparatus, a fixing apparatus, and the like.

In actual operations, an operator places a large-sized sheet (for example, A0 size in the short side direction or A1 size in the long side direction) on the document table 1 and inserts the document into a document unit 3 until the document reaches a predetermined position. Then, the document is fed into a reading position and the image on an image surface of the document is scanned and read by the image reading apparatus. After the image on the document is scanned and read, the image forming apparatus performs an image forming operation by supplying a transfer paper via a paper supply apparatus, performing an imaging process via the imaging apparatus, transferring a toner image onto the transfer paper via a transferring apparatus, and fixing the toner image onto the transfer paper via a fixing apparatus. General configurations and functions of the paper supply apparatus, the imaging apparatus, the transferring apparatus, the fixing apparatus are widely known. Therefore, the descriptions of the operations of those apparatuses are herein omitted.

Figure 2:
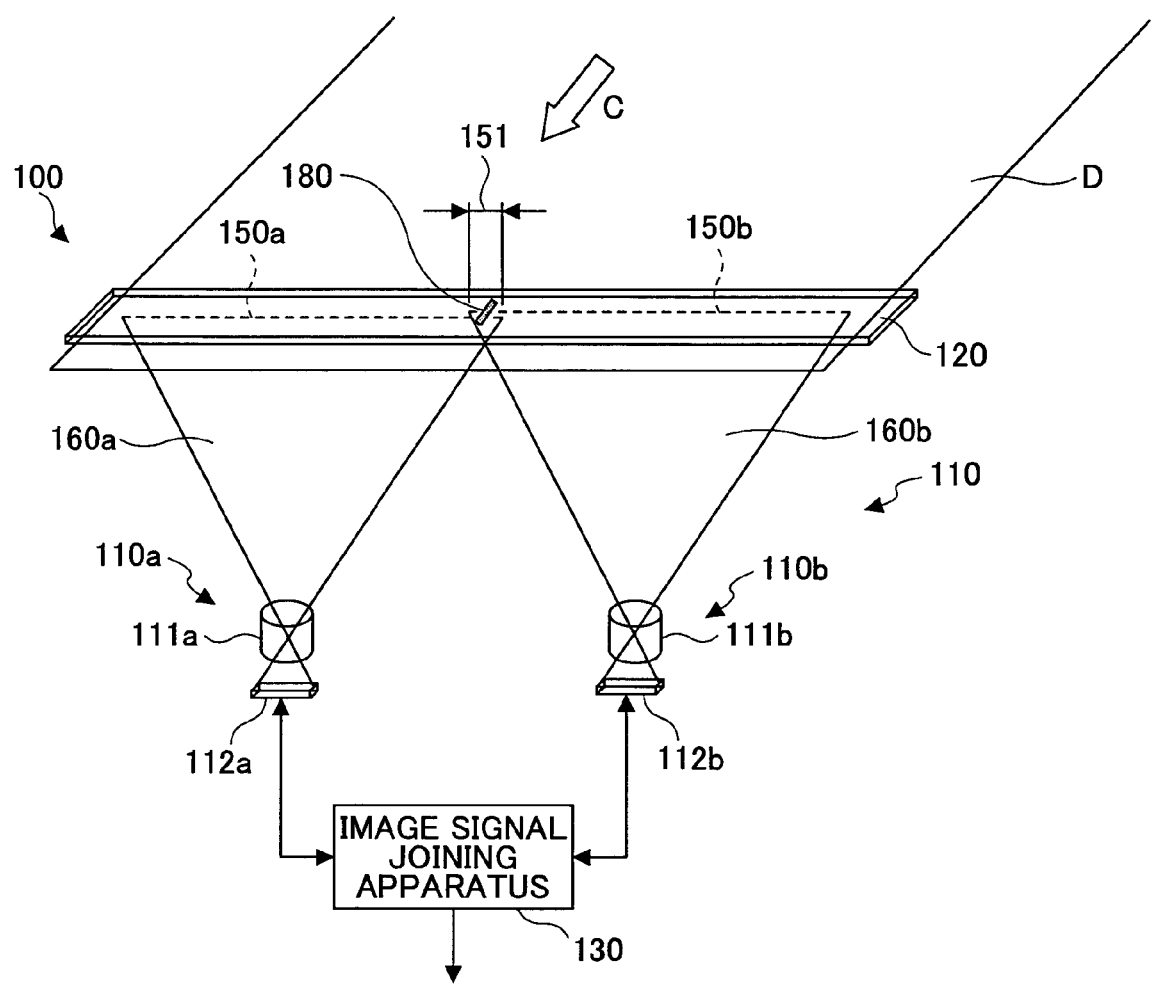
FIG. 2 is a schematic perspective view showing a configuration of an image reading apparatus according to the embodiment of the present invention.
Figure 3:
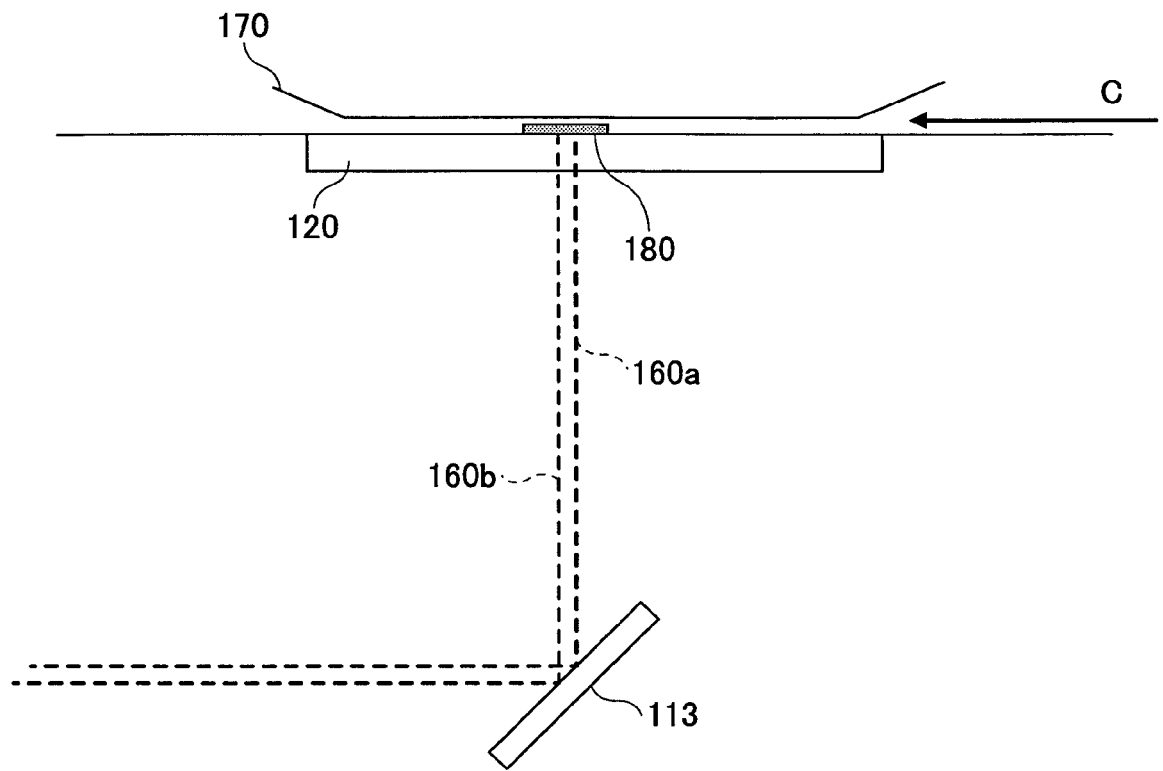
FIG. 3 is a cross-sectional view showing a document pressing plate of the image reading apparatus according to the embodiment of the present invention.

Next, an image reading apparatus according to an embodiment of the present invention is described. FIG. 2 is a schematic perspective view showing a configuration of the image reading apparatus according to the embodiment of the present invention, and FIG. 3 is a cross-sectional view showing a document pressing plate of the image reading apparatus according to the embodiment of the present invention. The image reading apparatus 100 according to the embodiment of the present invention performs image reading in monochrome mode. As shown in FIG. 2, the image reading apparatus 100 includes two optical systems 110a and 110b as a reading optical system of this image reading apparatus 100. When necessary, three or more optical systems may be arranged as the reading optical system. The optical systems 110a and 110b include a mirror 113 (see FIG. 3) for reflecting light reflected from a document D placed on a contact glass 120, imaging lenses 111a and 111b imaging an image of the document "D" (a document image), and line image sensors 112a and 112b, respectively. The line image sensors 112a and 112b output an image signal in accordance with reflected lights 160a and 160b from the respective image reading ranges on the contact glass 120, respectively. Image signals from the line image sensors 112a and 112b are joined (combined) by an image signal joining apparatus 130 which also serves as an image correcting apparatus.

Further, as shown in FIG. 3, the image reading apparatus 100 includes a document pressing plate 170 above the contact glass 120, preventing the document D from being lifted up.

Figure 4:
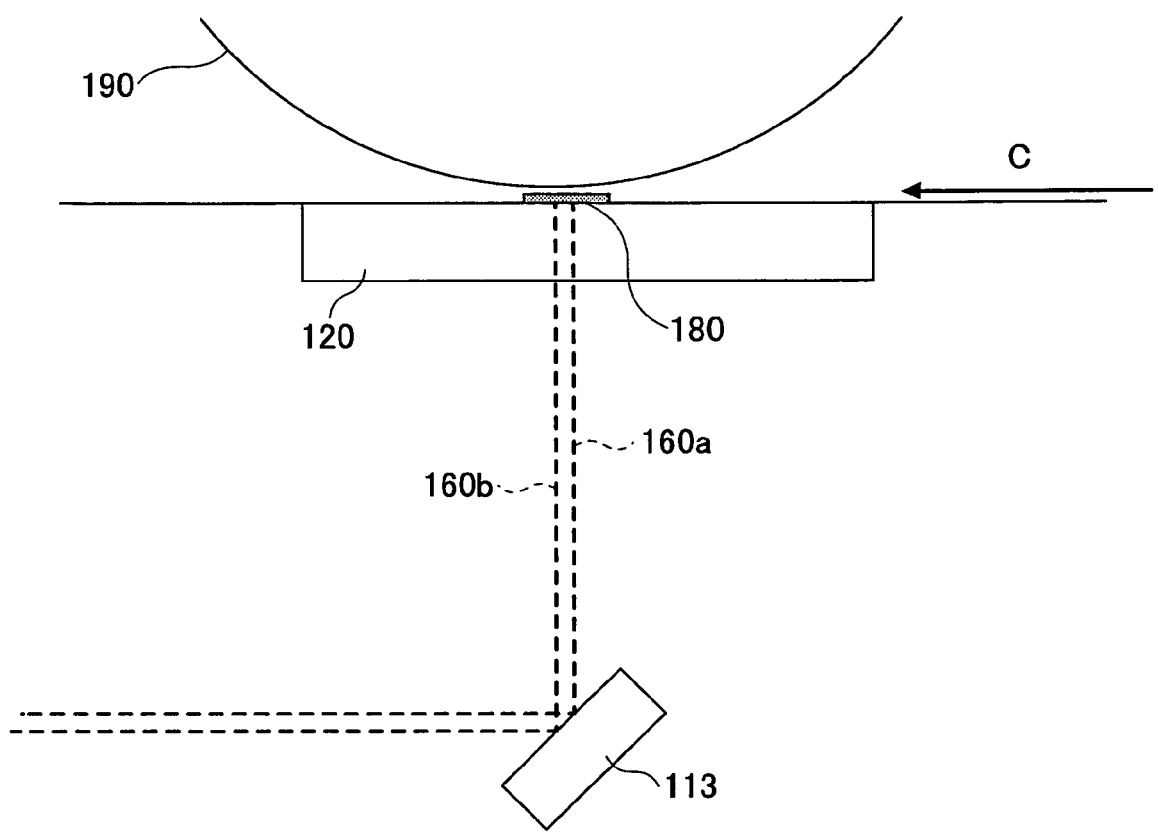
FIG. 4 is a cross-sectional view showing a document pressing roller of the image reading apparatus according to the embodiment of the present invention.

The document D is placed on the contact glass 120 so that the image printed surface of the document D faces the contact glass 120 and fed at a substantially constant speed while being pressed by the document pressing plate 170. In the image reading apparatus 100, instead of the document pressing plate 170, as shown in FIG. 4, a document pressing roller 190 may be used for pressing and feeding the document D.

Herein, the contact glass 120 is uniformly irradiated by a lighting apparatus (not shown). The reflected lights 160*a* and 160*b* from the document D are imaged on the line image sensors 112*a* and 112*b*, respectively, and read as image data after photoelectric conversion.

As shown in FIG. 2, in the optical systems 110*a* and 110*b*, read scanning lines 150*a* and 150*b* in the image reading range on the contact glass 120 are partially overlapped in an overlapping section 151. The overlapping section 151 is disposed at a substantially center portion of the image reading range (reading section) along the main scanning direction (a direction vertically crossing a document supplying direction and coinciding with a width direction of a document). Therefore, an image in the overlapping section 151 is similarly read by both read scanning lines 150*a* and 150*b*. Further, the optical systems 110*a* and 110*b* are adjusted in its manufacturing process so as not to cause the position shift in a sub scanning direction (a document supplying direction). The positions and angles of the imaging lenses 111*a* and 111*b* and the positions, angles, and like of the line image sensors 112*a* and 112*b* are adjusted by using actuators so that the MTF, the magnification ratio, the resist shift of the optical system are within the respective specification ranges. The position shifts in the main scanning direction are also adjusted as well.

In this image reading apparatus 100, the conjugation length of the imaging optical system is as long as about 600 mm. Therefore, when even an subtle position shift is caused in the line image sensors 112*a* and 112*b* or the imaging lenses 111*a* and 111*b*, the reading position on the scanning line on the contact glass is easily shifted by one dot or more, thereby degrading the image quality. This position shift may be caused by vibration during transportation and thermal expansion due to temperature change in the apparatus.

To overcome the problem, in this embodiment of the present invention, the image reading apparatus 100 is configured so that the position shift of the optical system is detected and corrected. Namely, in this embodiment of the present invention, a position-determining marking 180 (hereinafter simplified as a marking 180) is placed in the overlapping section 151 so that the marking 180 is detected by both line image sensors 112*a* and 112*b* of the optical systems 110*a* and 110*b*, respectively, and the correction is performed by the image signal joining apparatus 130.

More specifically, the marking 180 is placed in the overlapping section 151 which is on a document passing surface side (upper side in FIG. 3) of the contact glass 120. Further, the marking 180 serves as a transmitted light quantity reducing means to reduce only the light quantity of the light transmitting through the contact glass 120 by, for example, about 25%. In this embodiment of the present invention, the marking 180 is formed by firmly adhering a thin film filter, an ND filter, or the like having visible light transmittance of approximately 75% to the contact glass 120 with a uniform and transparent adhesive agent.

Figure 5:
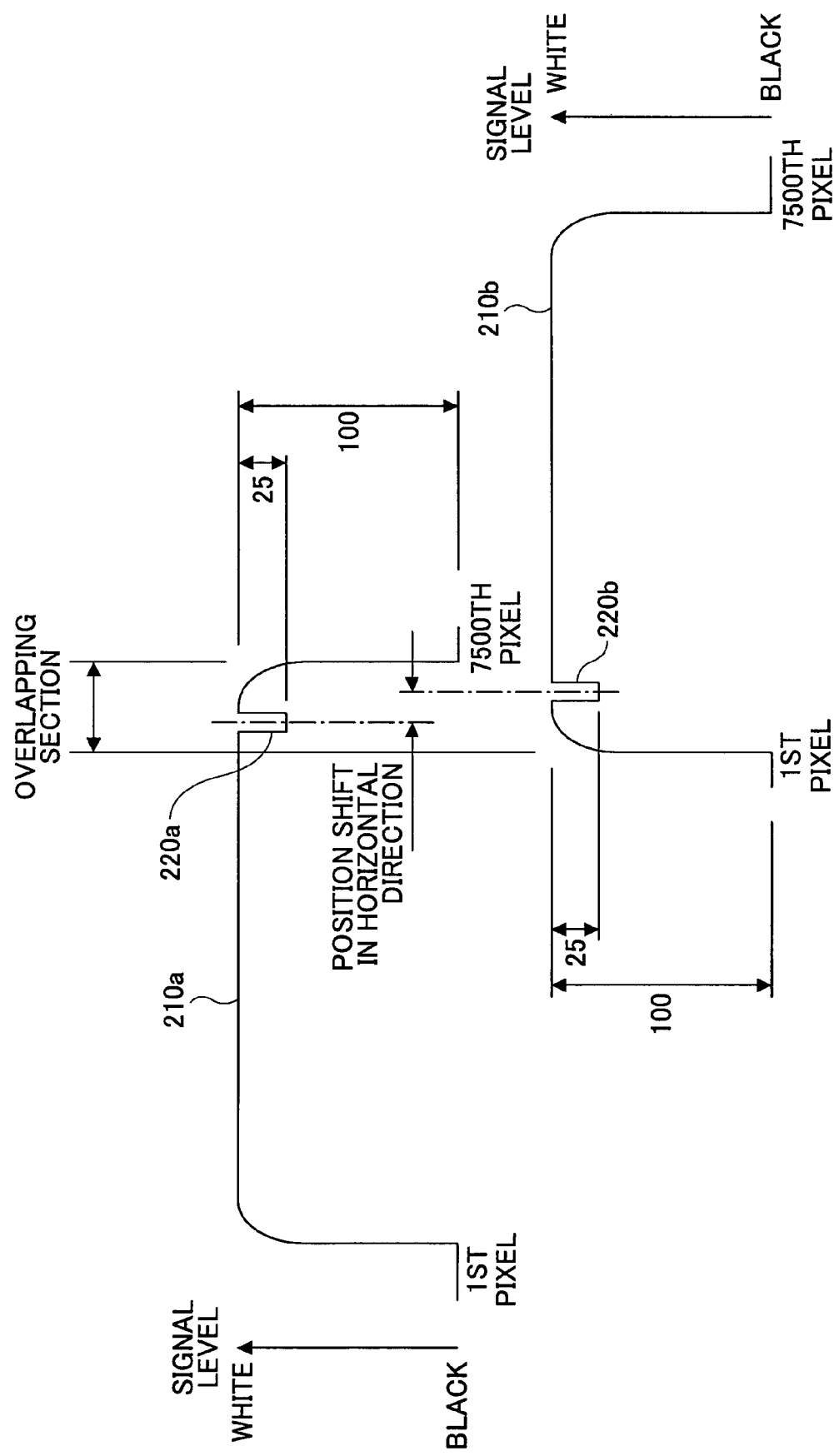
FIG. 5 is a schematic view showing image signals of two line image sensors.

FIG. 5 schematically shows the image signals of the two line image sensors 112*a* and 112*b*. FIG. 5 shows image signals 210*a* and 210*b* obtained by the line image sensors 112*a* and 112*b* of the optical systems 110*a* and 110*b*, respectively, upon reading image data when a white reference plate is set at the reading position. As shown in FIG. 5, the marking 180 is detected as light reduced bands 220*a* and 220*b* by the line image sensors 112*a* and 112*b*, respectively, where light quantity is reduced by approximately 25%. The image signal joining apparatus 130 performs a joining process using the light reduced bands 220*a* and 220*b* as a position determining reference and corrects the signals at the light reduced bands 220*a* and 220*b*. Namely, the image signal joining apparatus 130 joins the two image signals 210*a* and 210*b* in a manner so that the light reduced bands 220*a* and 220*b* are overlapped with each other to obtain a single continuous signal from the two image signals 210*a* and 210*b* of the line image sensors 112*a* and 112*b*.

Figure 6:
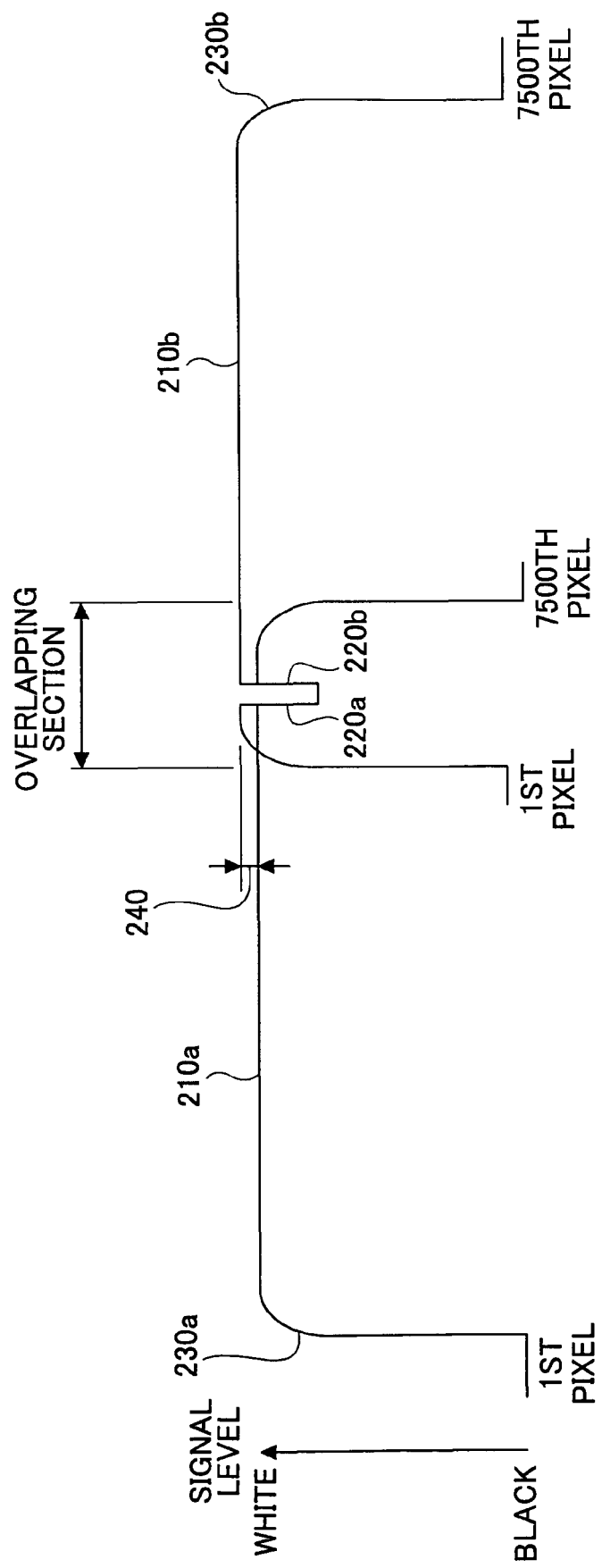
FIG. 6 is a schematic view showing where two image signals are superimposed.
Figure 7:
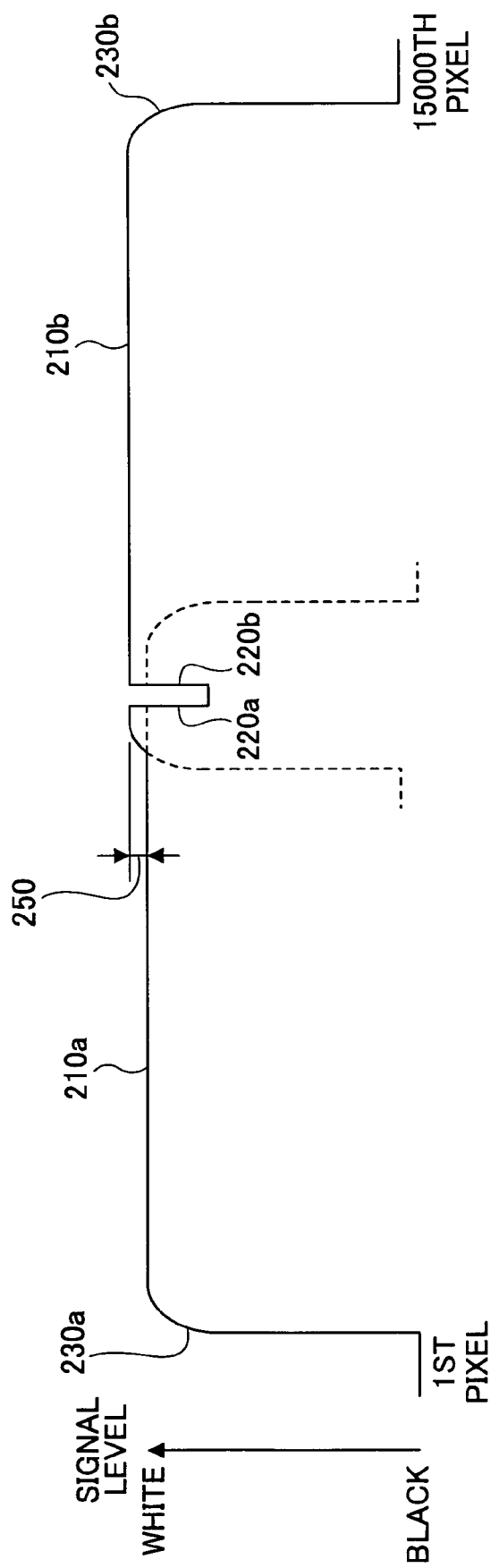
FIG. 7 is a schematic view showing where the two image signals are simply joined to each other.

However, when those two signals are simply joined, there may arise the following problems. Generally, a light source used in a reading optical system has an uneven light quantity distribution characteristic in which, for example, light quantity is reduced in the end sections of the light source, i.e., the image reading range. In addition, there is variation of the sensitivity in each device of the CCD line sensor. FIG. 6 schematically shows a case where two image signals are superimposed upon each other. On the other hand, FIG. 7 schematically shows a case where two image signals are simply joined to each other. As shown in FIG. 6, there are generated dips 230*a* and 230*b* in the image signals 210*a* and 210*b* due to reduction of light quantity at the end sections of the illumination light source. Also, there is a difference 240 caused by the difference in sensitivity between the line image sensors 112*a* and 112*b*. Therefore, when those two image signals are simply joined to each other (without any correction process), the dips 230*a* and 230*b* and the difference 240 remain without being changed as shown in FIG. 7. In order to solve the problems, the image signal joining apparatus 130 is configured to correct the light reduced bands 220*a* and 220*b* of the image signals 210*a* and 210*b*, respectively, and further corrects the dips 230*a* and 230*b* of the image signals 210*a* and 210*b*, respectively, and the difference 240 between the image signals 210*a* and 210*b*.

To that end, the image signal joining apparatus 130 performs a shading process. The shading process herein refers to a process in which the image signal data is flattened across the entire imaging region when data of the white reference plate is read. By doing this, it becomes possible to simultaneously correct the light quantity reduction (dips) at the end sections, the difference in sensitivity between the two line image sensors 112*a* and 112*b*, the variation in sensitivity among CCDs in the same line image sensor, signal intensity reduction due to the marking 180, and the like.

Figure 8:
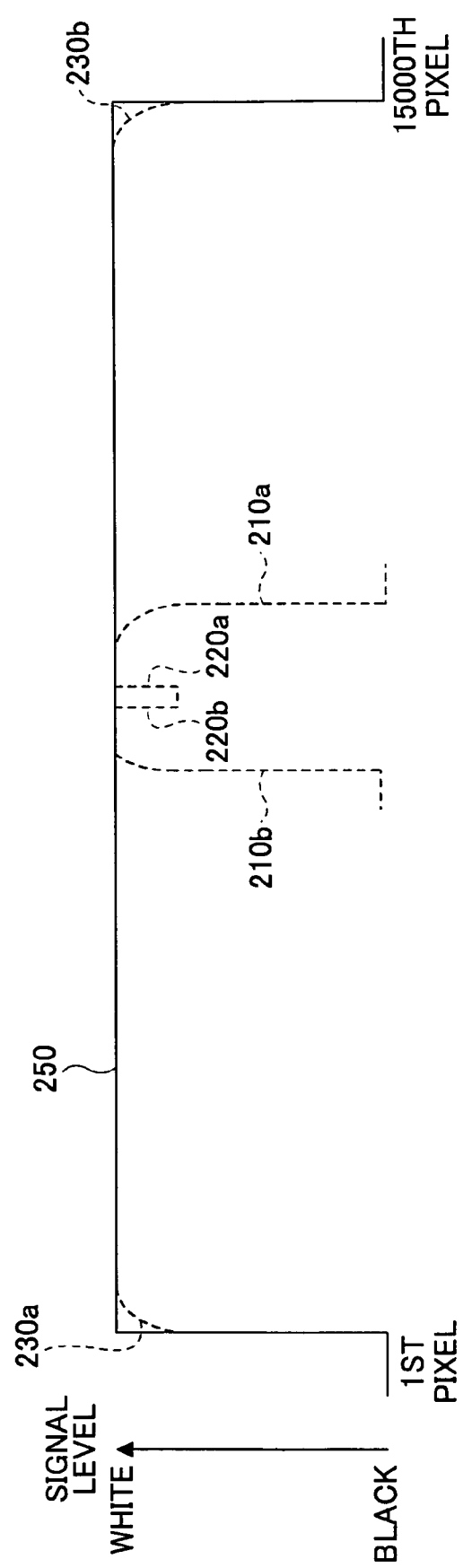
FIG. 8 is a schematic view showing an image signal corrected and joined by an image signal joining apparatus.

FIG. 8 schematically shows the image signal corrected and joined by the image signal joining apparatus 130. In this embodiment of the present invention, the image signal joining apparatus 130 performs the correction process by increasing the signal intensity by approximately 25% by using a known signal intensity correction method so that the signal intensity level at the light reduced bands 220*a* and 220*b* of the image signals 210*a* and 210*b*, respectively, be substantially equal to that of the adjacent sections. Further, due to the existence of the marking 180, the light quantity of the image data transmitted through the marking 180 is reduced. Therefore, when the above-mentioned correction is performed with respect to the input image data upon reading an image, it becomes possible to eliminate the influence of the marking 180 disposed on the contact glass 120 and avoid the degradation of the image quality such as a black streak.

Further, in this embodiment of the present invention, the marking 180 is always disposed on the contact glass 120, which enables the marking 180 to serve as a fixed reference for the position determination. With this configuration, the position shifts of the two line image sensors 112a and 112b may be detected with this simple configuration and without having a driving unit for moving a marking member back and forth and without turning ON and OFF a marking by irradiation.

Further, as described above, the image signal joining apparatus 130 simultaneously corrects the dips 230a and 230b caused by the light quantity reduction at the end sections, the difference 240 caused by the difference in sensitivity between the two line image sensors 112a and 112b, the signal intensity reduction due to the marking 180, and the like. With this feature, in this embodiment of the present invention, it is not necessary to provide separate signal intensity correction means, thereby enabling simplifying the structure, reducing the cost, and reducing time to correct the image data, which results in the increase of the operation speed of the whole image reading apparatus.

The marking 180 disposed on the contact glass 120 should not impede document feeding. To that end, the marking 180 is required to be made thin as much as possible. However, even though the marking 180 is made so thin, a step (difference in height) is inevitably generated. Such a step generated on a document feeding path may cause catching of the document, peeling off of the marking 180, and finally jamming of the document. To overcome the problems, in this embodiment of the present invention, a transmitted light quantity reduction section made of an evaporated film is formed on the contact glass 120 as the marking 180. The reduction of the light quantity by the evaporated film is easily achieved by performing a conventional mirror coating process of controlling the thickness of a film. For example, by using a masking member formed by a cut out in accordance with the marking shape when the evaporated film is formed, it becomes possible to form a marking having a predetermined shape. The marking 180 formed as the evaporated film may have a thickness in the order of micrometers. Therefore, it may become possible to prevent a document from being caught and as a result, peeling off of the marking 180 may be avoided.

Further, in this embodiment of the present invention, from the upper position, an antistatic film is placed onto the evaporated film constituting the marking 180 so that the antistatic film is coated on the evaporated film. Further, when the document is fed on the contact glass 120, the document may rub the contact glass 120 and static charge may be generated. This generated static charge may impede the feeding of the document. To avoid this problem, in the embodiment of the present invention, the antistatic film is placed onto the whole document passing surface side of the contact glass 120. This may prevent the marking 180 from being abraded when the document passes on and scrapes the contact glass 120. As a result, the marking 180 may maintain its role as a marking to be used for detecting the position shift for a long term.

As the marking 180, instead of the evaporated film, a thin film, an ND film, or the like having visible light transmittance of approximately 75% may be used by adhering to the contact glass 120. In this case, the contact glass 120 is covered with the antistatic film from the upper side of the contact glass 120. By doing this, it becomes possible to prevent the document from being caught and the marking 180 from being peeled off, thereby attaining the same effect as the evaporated film is used.

Further, instead of the antistatic film, an anti-abrasion coating film may be applied. By applying this, the abrasion and the peeling off of a transmittance reduction section (transmitted light quantity reduction section) may be avoided, and the same effect as the antistatic film being used may be obtained.

Second Embodiment

Figure 9:
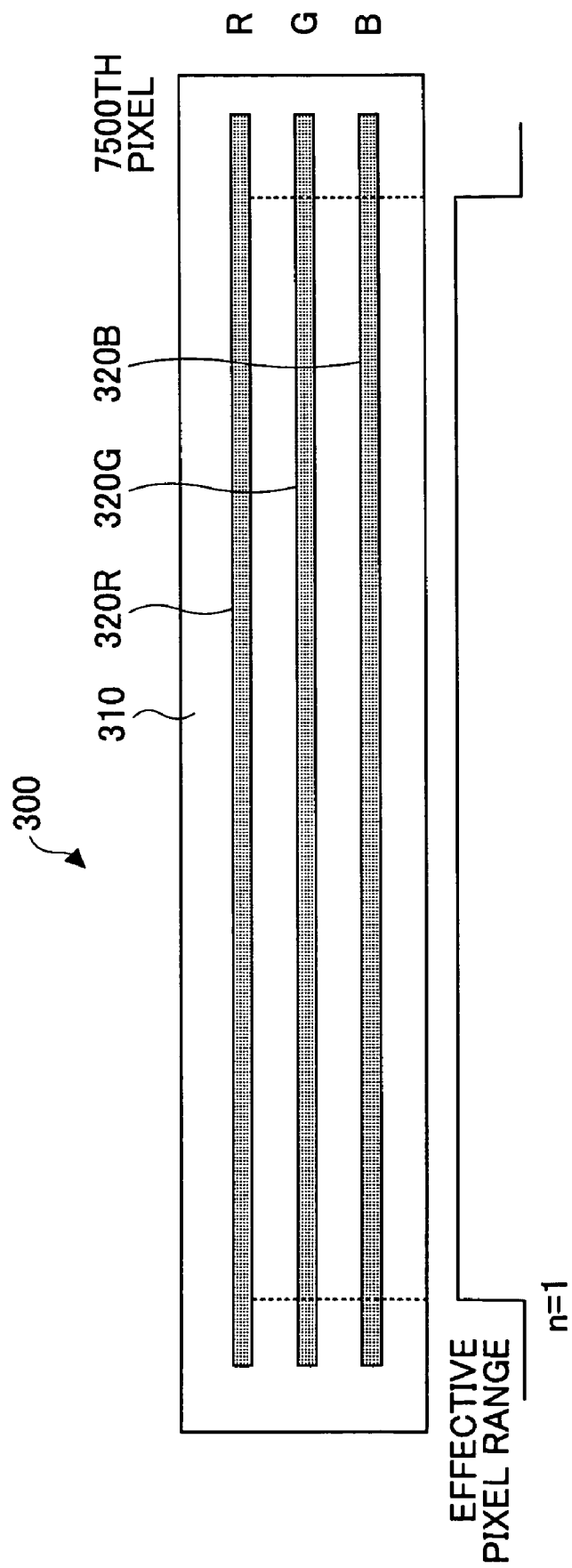
FIG. 9 is a plan view showing a color line image sensor of an image reading apparatus according to a second embodiment of the present invention.

Next, an image reading apparatus according to a second embodiment of the present invention is described. The image reading apparatus according to this embodiment of the present invention is a full-color image reading apparatus capable of reading image data in a full-color (RGB color) mode. The reading optical system in the image reading apparatus is similar to that of the above first embodiment of the present invention. FIG. 9 is a plan view showing a color line image sensor of the image reading apparatus according to the second embodiment of the present invention. As shown in FIG. 9, the line image sensor 300 includes a substrate 310 and three-color image sensors 320R, 320G, and 320B, for Red (R), Green (G), and Blue (B) colors, respectively, disposed, for example, every four lines on the substrate 310.

Figure 10:
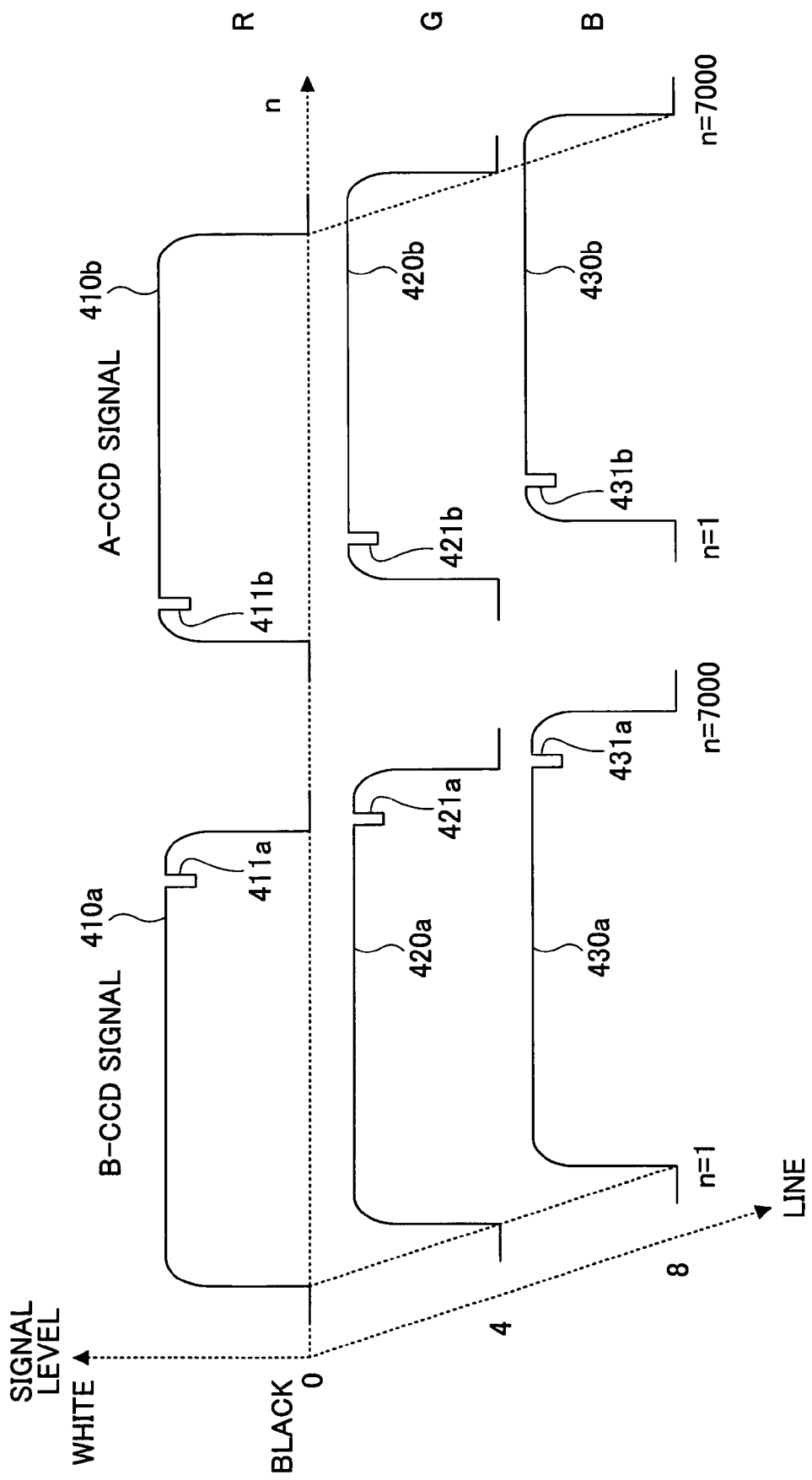
FIG. 10 is a schematic view showing image signals of the color line image sensor in the image reading apparatus according to the second embodiment of the present invention.

A white light reflected from the white reference plate is separated into RGB lights when transmitted through Red, Green, and Blue filters of the image sensors 320R, 320G, and 320B, respectively, and the RGB lights are incident to the image sensors 320R, 320G, and 320B, respectively. In this example, when the marking 180 is used that uniformly reduces the transmittance with respect to all colors, the data of the image sensors are indicated as described below. FIG. 10 is a schematic view showing image signals of the color line image sensors in the image reading apparatus according to the second embodiment of the present invention. As shown in FIG. 10, there are generated light reduced bands 411a and 411b, light reduced bands 421a and 421b, and light reduced bands 431a and 431b, in the R image signals 410a 410b, G image signals 420a and 420b, and B image signals 430a and 430b, respectively. The image signal joining apparatus 130 corrects and joins the R image signals 410a 410b, G image signals 420a and 420b, and B image signals 430a and 430b in the same manner as described in the first embodiment of the present invention. By configuring in this way, the present invention may be applied to a full-color image reading apparatus.

Figure 11:
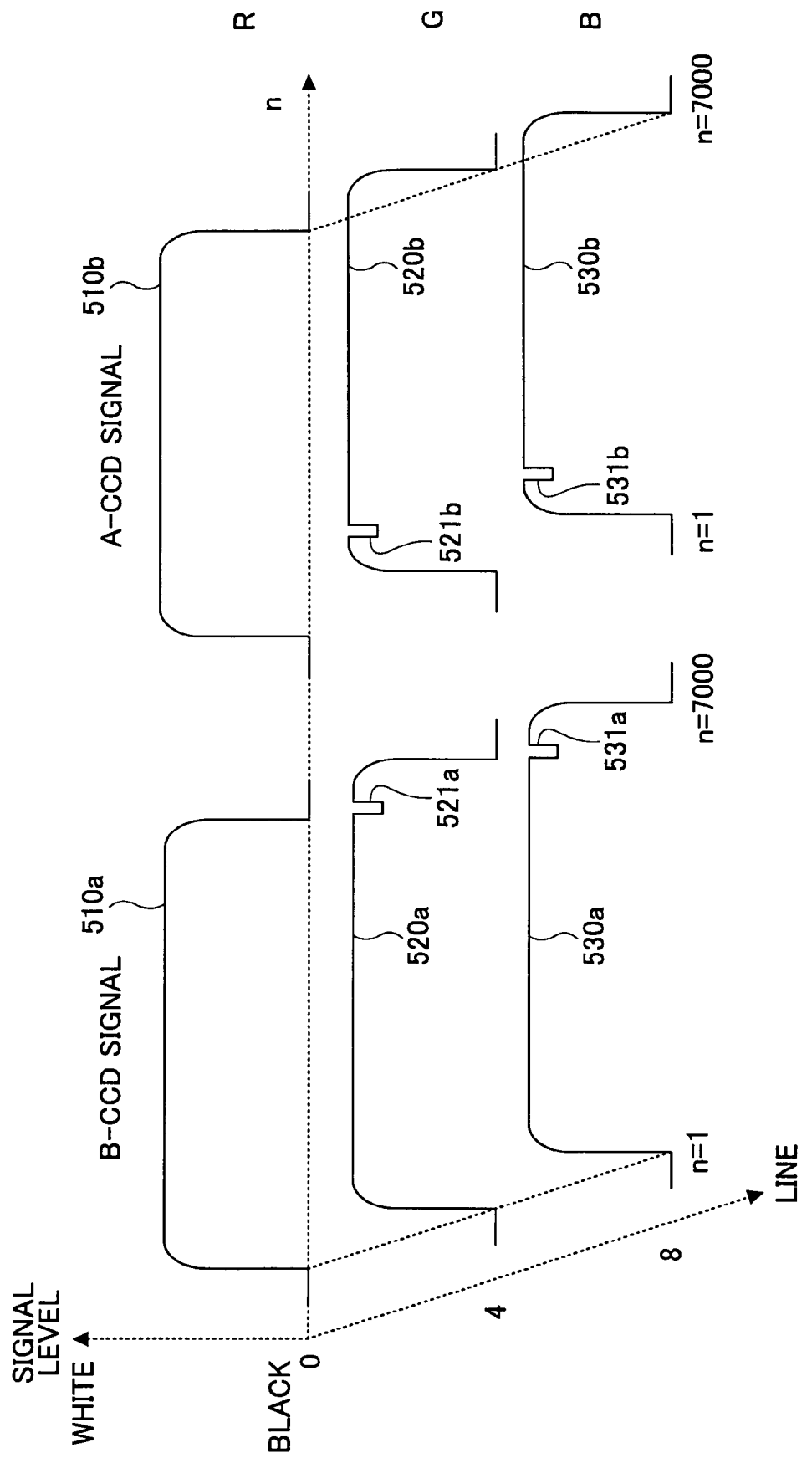
FIG. 11 is a schematic view showing the image signals of the color line image sensor when a red-color filter is used as a marking.

Next, a modified embodiment of the second embodiment of the present invention is described. In this modified embodiment, for example, a red-color filter is used that serves as a filter to reduce the light quantity of transmitted light in a predetermined wavelength range. FIG. 11 is a schematic view showing the image signals of the color line image sensors when the red-color filter is used as the marking 180. As shown in FIG. 11, in this example, there is no light reduced band generated in R image signals 510a and 510b, while there are generated light reduced bands 521a and 521b and light reduced bands 531a and 531b in the G image signals 520a and 520b and B image signals 530a and 530b, respectively. The image signal joining apparatus 130 performs the position determination and correction process based on the light reduced bands 521a and 521b. According to the image reading apparatus in this example, it may become easy to distinguish the marking 180 from foreign material on the contact glass 120.

Figure 12:
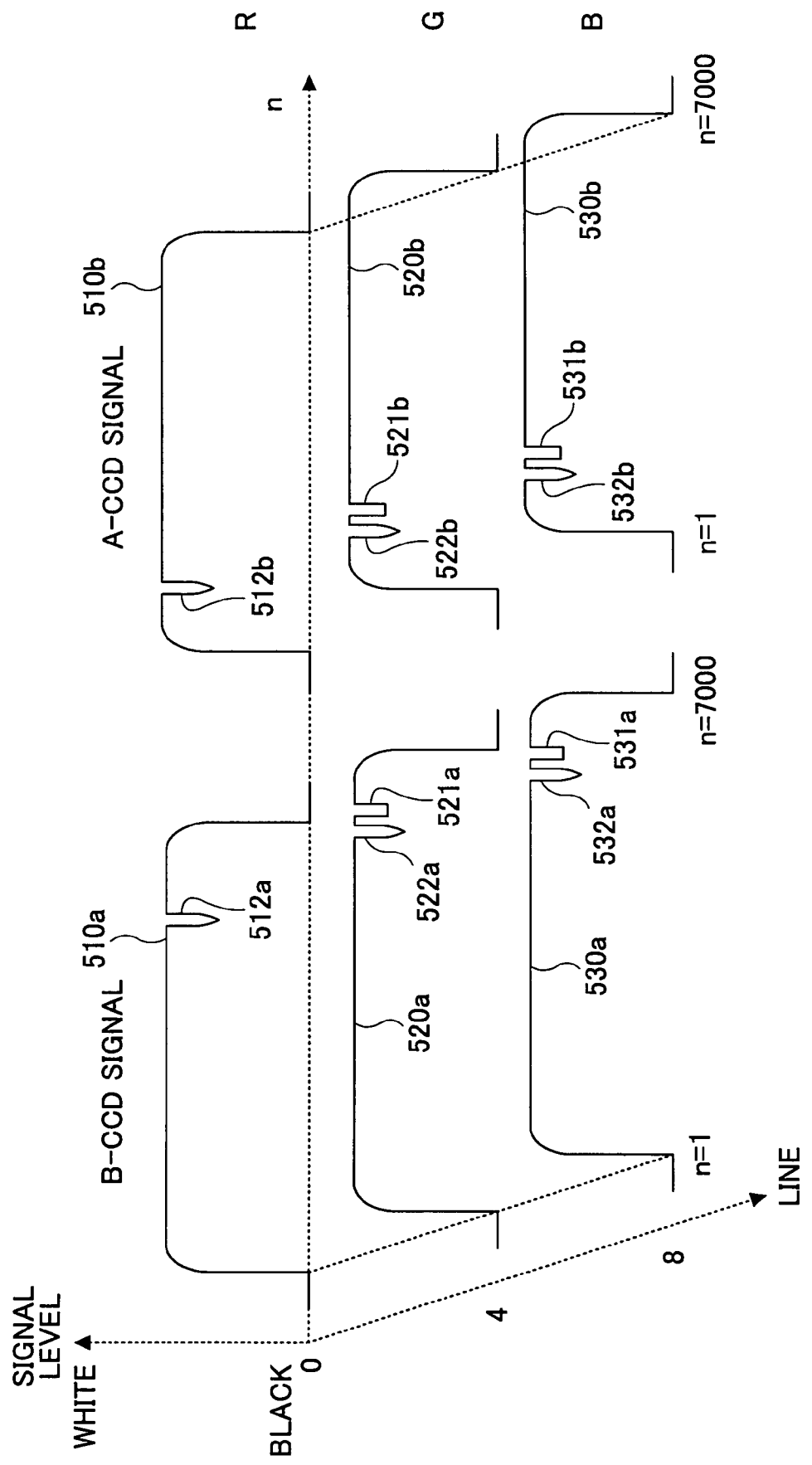
FIG. 12 is a schematic view showing the image signals when foreign material is adhered to the contact glass of the image reading apparatus.

FIG. 12 schematically shows the image signals when foreign material is on the contact glass 120. Namely, FIG. 12 schematically shows the image signals of color line image sensors when foreign material or a stain is adhered near the marking 180 of the red-color filter. When such foreign material is adhered as described above, there are generated foreign material bands 512a and 512b indicating the foreign material in the R image signals 510a and 510b, respectively, while there are generated foreign material bands 522a and 522b and light reduced bands 521a and 521b in the G image signals 520a and 520b, respectively and foreign material bands 532a and 532b and light reduced bands 531a and 531b in the B image signals 530a and 530b, respectively. Then, the image signal joining apparatus 130 corrects the G image signals 520a and 520b and the B image signals 530a and 530b based on the foreign material bands 512a and 512b generated in the R image signals 510a and 510b. By dong this, it may become possible to correctly recognized the shape and the position of the marking 180. As a result, even when foreign material is adhered near the marking 180, the image signal joining apparatus 130 may distinguish the marking 180 from the foreign material and correctly detect and correct the shift of the image position.

Figure 13:
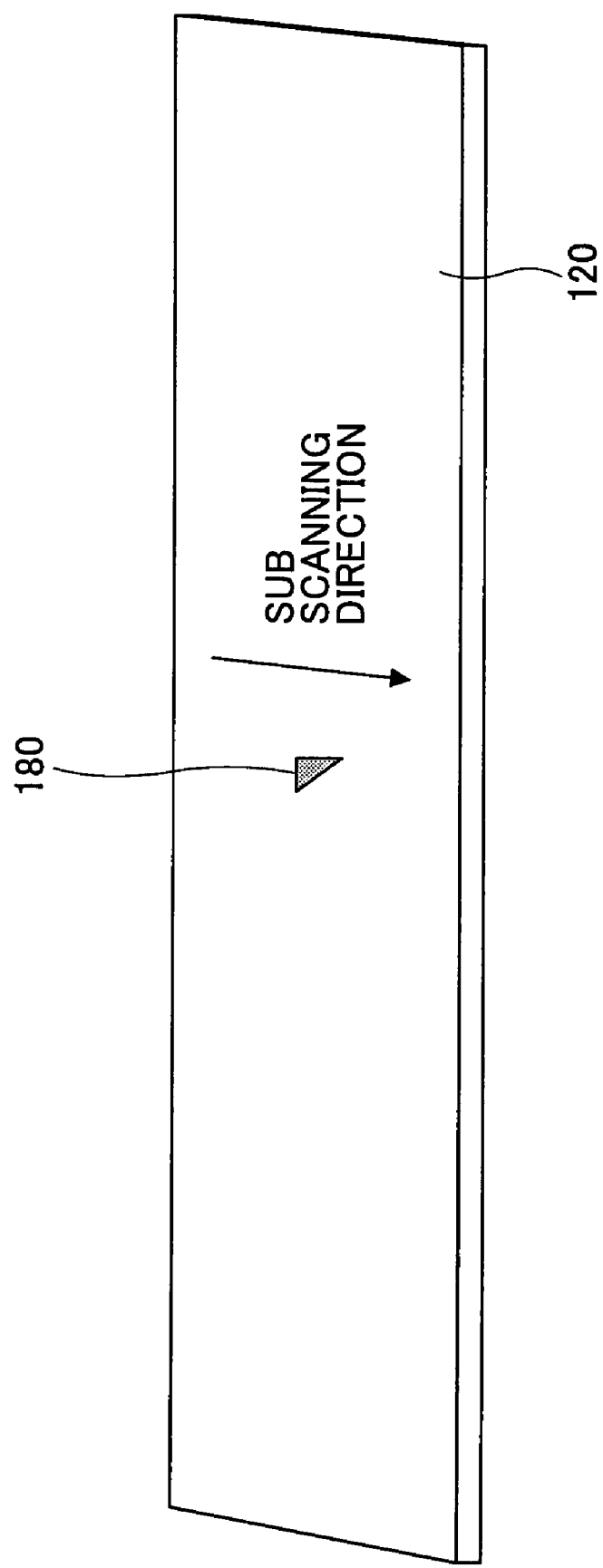
FIG. 13 is a perspective view showing an exemplary shape of the marking.

In each of the above embodiments, the marking 180 may have a shape as described below. FIG. 13 is a perspective view showing a shape of the marking 180. In this example, the marking 180 has a shape in which the width size in the main scanning direction changes in the sub scanning direction. Namely, in this example, the marking 180 has a substantially triangular shape in which the width size in the main scanning direction becomes shorter in the sub scanning direction. By detecting this marking 180, it becomes possible to correctly detect the position shift in the sub scanning direction based on the width size information in the main scanning direction. As the methods of correcting the position shift in the sub scanning direction, as described in the prior art in this description, there are many conventional methods available in some documents, therefore, the detailed description of such method is herein omitted.

As described above, according to an embodiment of the present invention, it may become possible to detect an image position shift with a simple configuration.

Further, according to an embodiment of the present invention, the shading process is employed to correct the obtained image signals. Therefore, there may be no need to provide separate signal intensity correction means, thereby enabling simplifying the structure, reducing the cost, and reducing time to correct the image data, which results in the increase of the operation speed of the whole image reading apparatus.

Further, according to an embodiment of the present invention, the transmitted light quantity reduction section is made of an evaporated film. Therefore, the catching of the document, the peeling off of the film, the jamming of the document, and the like may be avoided and good performance in document feeding may be easily maintained.

Further, according to an embodiment of the present invention, antistatic coating is applied so as to cover the marking. Therefore, it may become possible to prevent the marking from being abraded and maintain the performance of the marking for a long term.

Further, according to an embodiment of the present invention, the anti-abrasion coating is applied so as to cover the marking. Therefore, it may become possible to prevent the marking from being abraded and maintain the performance of the marking for a long term.

Further, according to an embodiment of the present invention, the marking is configured so that only the light quantity of transmitted light in a predetermined wavelength range is reduced. Therefore, it may become possible to distinguish the marking from foreign material and correctly detect the position shift of the image position.

Further, according to an embodiment of the present invention, the marking has a shape in which the width size in the main scanning direction changes in the sub scanning direction. Therefore, it may become possible to correctly detect the position shift in the sub scanning direction based on the information of the main scanning direction.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application No. 2008-006446, filed on Jan. 16, 2008, the entire contents of which are hereby incorporated herein by reference.

What is claimed is:

1. An image reading apparatus, comprising:
a contact glass on which a document is placed;
an imaging device configured to image a document image based on light reflected from the document through the contact glass;
plural line image sensors arranged along a main scanning direction at positions where the document image is imaged and configured so that end portions of the line image sensors adjacent to each other similarly read a same image data imaged at an overlapping area, wherein the image data at the overlapping area similarly read by the end portions of the plural line image sensors are joined to form continuous image data;
a transmitted light quantity reduction unit disposed in the overlapping area on the contact glass and configured to reduce transmitted light quantity of a light transmitted through the contact glass in the overlapping area by a fraction of the light transmitted to a remainder of the contact glass; and
a signal correction device configured to correct the signal intensity of the image data similarly read by the line image sensors adjacent to each other, by increasing a signal intensity level of light reduced bands representing the overlapping area to a signal intensity level equal to bands representing the light transmitting through the remainder of the contact glass.

2. The image reading apparatus according to claim 1, wherein the signal correction device performs a shading process.

3. The image reading apparatus according to claim 1, wherein the transmitted light quantity reduction unit is formed of an evaporated film.

4. The image reading apparatus according to claim 3, wherein
the evaporated film reduces only the light quantity of transmitted light in a predetermined wavelength range.

5. The image reading apparatus according to claim 1, wherein
the contact glass is covered with antistatic coating so that the transmitted light quantity reduction unit is covered with the antistatic coating.

6. The image reading apparatus according to claim 1, wherein
the contact glass is covered with anti-abrasion coating so that the transmitted light quantity reduction unit is covered with the anti-abrasion coating.

7. The image reading apparatus according to claim 1, wherein
the transmitted light quantity reduction unit reduces only the light quantity of transmitted light in a predetermined wavelength range.

8. The image reading apparatus according to claim 1, wherein
a width size of the transmitted light quantity reduction unit in the main scanning direction changes in the sub scanning direction.

9. An image forming apparatus comprising:
an image reading apparatus according to claim 1.

10. The image reading apparatus according to claim 1, further comprising a pressing plate configured to prevent the document from being lifted up while the document is being fed to the image reading apparatus at a constant speed.

11. The image reading apparatus according to claim 1, further comprising a document pressing roller configured to prevent the document from being lifted up while the document is being fed to the image reading apparatus at a constant speed.

12. The image reading apparatus according to claim 1, wherein the image data at the overlapping area is overlapped at substantially a center portion of an image reading range.

13. An image reading method, comprising:
imaging a document image based on light reflected from a document through a contact glass, similarly reading a same image data imaged at an overlapping area by end portions of plural line image sensors adjacent to each other;
joining the image data at the overlapping area similarly read by the end portions of the plural line image sensors to form continuous image data;
reducing transmitted light quantity of a light transmitted through the contact glass in the overlapping area by a fraction of the light transmitted to a remainder of the contact glass; and
correcting the signal intensity of the image data similarly read by the line image sensors adjacent to each other, by increasing a signal intensity level of light reduced bands representing the overlapping area to a signal intensity level equal to bands representing the light transmitting through the remainder of the contact glass.

14. The image reading method according to claim 13, further comprising performing a shading process to correct the signal intensity of the image data similarly read by the line image sensors adjacent to each other.

15. The image reading method according to claim 13, further comprising reducing transmitted light quantity of a light transmitted through the contact glass in the overlapping area using an evaporated film.

16. The image reading method according to claim 15, further comprising only reducing the light quantity of transmitted light in a predetermined wavelength range using the evaporated film.

17. The image reading method according to claim 13, further comprising covering the contact glass with an antistatic coating.

18. The image reading method according to claim 13, further comprising covering the contact glass with an anti-abrasion coating.

19. The image reading method according to claim 13, further comprising only reducing the light quantity of transmitted light in a predetermined wavelength range.

20. The image reading method according to claim 13, further comprising preventing the document from being lifted up while the document is being fed to an image reading apparatus at a constant speed.

* * * * *